United States Patent
Sachan et al.

(10) Patent No.: US 8,818,880 B1
(45) Date of Patent: Aug. 26, 2014

(54) SYSTEMS AND METHODS FOR SOURCE IDENTIFICATION IN ITEM SOURCING

(75) Inventors: Mayank Sachan, Seattle, WA (US); Manish R. Bansal, Snoqualmie, WA (US); Lipi Sanghi, Delhi (IN)

(73) Assignee: Amazon Technologies, Inc., Reno, NV (US)

(*) Notice: Subject to any disclaimer, the term of this patent is extended or adjusted under 35 U.S.C. 154(b) by 267 days.

(21) Appl. No.: 12/877,060

(22) Filed: Sep. 7, 2010

(51) Int. Cl.
*G06Q 30/00* (2012.01)

(52) U.S. Cl.
USPC .................. 705/26.1; 705/27.1; 705/26.4

(58) Field of Classification Search
USPC ................................. 705/26.1–27.2
See application file for complete search history.

(56) References Cited

U.S. PATENT DOCUMENTS

| | | | |
|---|---|---|---|
| 8,032,425 | B2 | 10/2011 | Yi |
| 8,090,625 | B2 | 1/2012 | Yi |
| 2007/0250403 | A1 | 10/2007 | Altschuler |
| 2008/0004989 | A1* | 1/2008 | Yi .................................. 705/27 |
| 2008/0082528 | A1* | 4/2008 | Bonzi et al. ....................... 707/5 |
| 2009/0138329 | A1* | 5/2009 | Wanker ........................... 705/10 |
| 2009/0313088 | A1* | 12/2009 | Ali et al. ......................... 705/10 |
| 2010/0010912 | A1* | 1/2010 | Jones et al. ..................... 705/26 |
| 2010/0057717 | A1* | 3/2010 | Kulkarni ......................... 707/5 |
| 2010/0094529 | A1 | 4/2010 | Gupta et al. |
| 2010/0241621 | A1* | 9/2010 | Randall .......................... 707/709 |
| 2011/0145039 | A1* | 6/2011 | McCarney et al. ............ 705/7.32 |

OTHER PUBLICATIONS

Ono, C., Nishiyama, S., Kim, K., Paulson, B. C., Cutkosky, M., & Petrie, C. J. (2003). Trust-based facilitator: Handling word-of-mouth trust for agent-based E-commerce. Electronic Commerce Research, 3(3-4), 201. Retrieved from http://search.proquest.com/docview/216872121?accountid=14753 [recovered from ProQuest on Apr. 2, 2014].*

* cited by examiner

*Primary Examiner* — Kathleen Palavecino
(74) *Attorney, Agent, or Firm* — Knobbe, Martens, Olson & Bear LLP

(57) ABSTRACT

A source identification service is described that identifies sources for items of interest that are provided by a network-based service and may benefit from additional sources. The source identification service may identify sources for an item of interest in response to receipt a request. In one aspect, the source identification service may conduct a search of a network-based information resource using keywords pertaining to the item of interest to obtain a listing of sources capable of providing the item of interest. A source score may be generated for respective sources and compared to a selected value to identify potential sources for further consideration. The potential sources may also be filtered based upon selected criteria to refine the list of potential sources. An offer may be provided by the source identification service inviting the source to provide the item of interest on the network-based service.

25 Claims, 5 Drawing Sheets

SYSTEMS AND METHODS FOR SOURCE IDENTIFICATION IN ITEM SOURCING

BACKGROUND

Generally described, computing devices and communication networks facilitate network-based commerce. For example, a user may employ his or her computing device to access a network-based service for the purchase of items and services (collectively and individually referred to as "items") such as music, books, and electronics, just to name a few.

To improve the selection of items offered and provide lower prices for items, network-based services may offer products from a variety of sources. In one example, the network-based service may provide items directly for sale. In another example, the network-based service may provide items indirectly for sale, listing an item for sale that is provided by another source. In this manner, the product offerings of the network-based service may be augmented by those of the other sources. Advantageously, users of the network-based service may be provided with more items from which to choose and/or lower prices for items, increasing the likelihood that users may purchase items from the network-based service.

However, adding sources to a network-based service may be expensive, time consuming, and difficult. In one example, it may be difficult to identify which of the items offered by the network-based service items are in need of additional sources. Furthermore, many sources may offer a selected item for sale. It may be difficult to identify which source or sources to employ. As a result, it may be challenging for a network-based service to add additional sources for its product offerings.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Generally described, embodiments of the present disclosure relate to sourcing items of interest provided on a network-based service (e.g., a network-based retailer). In this regard, a source identification service is described that identifies items of interest provided on the network-based service that may benefit from additional sources. Sources may include one or more of sellers that offer goods and/or services for sale and producers of goods and/or services (e.g., manufacturers, service providers). The source identification service may further identify sources capable of providing the item of interest and present offers to such sources inviting the sources to provide the item of interest on the network-based service.

As discussed in greater detail below, the source identification service may identify an item of interest based upon information gathered from user requests regarding the item of interest. For example, a user may request information regarding the item of interest from the network-based service. In response to the item information request, the network-based service may present the user with search results pertaining to the item of interest. The user may further select from the search results in order to obtain detailed information regarding the item of interest. The network-based service may further store information regarding the user query, such as the search results and requests for detailed item information In order to identify whether the item of interest may benefit from having additional sources, the source identification service may obtain and analyze the user request information. For example, the source identification service may analyze the user request information to determine the popularity of the item of interest and, from the popularity of the item of interest, identify whether the item of interest may benefit from additional sources. In another example, the source identification service may analyze the item search results to identify whether the item of interest may benefit from additional sources.

For example, assume that the item of interest is a movie. In certain embodiments, as discussed in greater detail below, if the popularity of the movie is determined to be greater than a selected value, the movie may be identified as benefiting from additional sources. This determination reflects the consideration that it is desirable to have more sources, and therefore more options, for a movie that is relatively popular. In alternative embodiments, if the number of search results returned for the movie is determined to be less than a selected value, the movie may be identified as benefiting from additional sources. This determination reflects the consideration that a movie having less than the selected number of search results is not well represented for sale on the network-based service and that additional sales might be driven by providing more sources for the movie.

The source identification service may further identify sources capable of providing the item of interest. In one aspect, the source identification service may obtain a list of sources relevant to the item of interest. In another aspect, the source identification service may identify sources for further consideration from the obtained list of sources on the basis of a score for generated each of the sources within the obtained list. In an additional aspect, the source identification service may filter the identified sources to yield a reduced list of sources. Contact information for the sources remaining on the reduced list may be obtained and offers may be further provided by the source identification service to invite the sources from the reduced list to provide the item of interest on the network-based service.

Continuing the example of a movie as the item of interest, sources capable of providing the movie and/or the movie having selected characteristics (format, release, etc.). For example, a list of sources having twenty listed sellers may be obtained. As discussed in greater detail below, the source identification service may identify ten sources having a score above a selected value and ten sources having a score below the selected value. The ten sources having a source score above the selected value may be further considered. For instance, a selected portion of the ten remaining sources, such as three, may be removed by filtering based upon selected source criteria, leaving seven sources remaining for consideration. Contact information for the remaining seven sources may be obtained and offers inviting the sources to provide the movie for sale on the network-based service may be distributed. Affirmative answers to an offer may result in the movie being offered for sale by the network-based service for the affirmatively responding source. Negative answers may result in the movie not being offered for sale by the network-based service for the negatively responding source.

The item of interest may be any good or service. In certain embodiments, the item of interest may include objects (e.g., an articles of manufacture, plants, animals), events (e.g., games, concerts, movies), and services (e.g., travel services, financial services, residential services). Reference to an item of interest may be further understood to include both general references to an item and references to specific variations of the item. For example, assume an item of interest is a book. The book may be referenced to in general by its title, title and author, and other general descriptors. In other aspects, the book may be referenced to in more specific terms by its title in combination with an edition, whether the book is in paperback or hard cover, its publisher, its date of printing, and the like.

The network-based service may receive a request for information regarding an item of interest from a user employing his or her user computing device. The information request may include information identifying the item of interest such as an item name, item model, and the like. The information request may optionally include identifying information regarding the user and/or a computing device employed by the user to submit his or her request.

In response to receiving the request for information regarding the item of interest, the network-based service may search records of items that may be purchased from the network-based service. The item search results may be returned to the user. For example, in the case of the movie, the item search results may include different editions (e.g., director's cut, theatrical release), different formats (VHS, DVD, Blu-Ray, download), and the like. The user may further select from the item search results to request detailed item information regarding the item of interest. For example, the user may request more information regarding a director's cut of the movie in a DVD format.

In an embodiment, the source identification service may identify whether the item of interest may benefit from additional sources based upon one or more of the popularity of the item of interest and the item search results returned for the item of interest. An item of interest having a relatively high popularity, such as a movie starring a well-known actor, may be interpreted to mean that the item is likely to be in highly sought after by users for purchase and may benefit from being provided by additional sources. In contrast, an item of interest having a relatively low popularity, such as a relatively unknown foreign film, may indicate that the item is unlikely to receive significant demand for purchase by users and may not benefit from being provided by additional sources.

The source identification service may determine the popularity of the item of interest by an analysis of requests for detailed item information for the item of interest. In one embodiment, popularity may include the total number of times that item detail information for the item of interest is requested over a selected duration of time, referred to herein as an item request rate. In another embodiment, popularity may be measured by the time duration over which the received item detail information is accessed by users (e.g., viewed), referred to herein as an item access time. In a further embodiment, popularity may be measured by the total number of unique users and/or user computing devices requesting the item detail information, referred to herein as a user request count. Items of interest having greater than a selected item request rate, greater than a selected item access time, and/or greater than a selected item request count may be identified as popular items and determined to benefit from additional sources.

For example, continuing the example of a selected movie as the item of interest, if the movie is highly anticipated, the network-based service may receive a large number of requests for detailed information regarding the movie in a relatively short length of time, resulting in a high item request rate for the movie. Alternatively, users may select and view item detail information for the movie for a substantial period of time, resulting in a high item access time for the movie. In an additional aspect, a large number of different users (e.g., unique users) may request detailed item information regarding the movie. In certain embodiments, unique user computing devices may be employed as a proxy for unique users. If the respective popularity of the movie is greater than a selected value, the movie may be identified as benefiting from additional sources. By providing the movie through additional sources, the network-based service may be able to substantially avoid running out of copies of the popular movie title and/or provide the movie at a lower cost, increasing the likelihood of user purchase.

In alternative embodiments, the source identification service may identify whether an item of interest is to be provided by additional sources based upon an analysis of the item search results generated for the item of interest. For example, an analysis of the item search results may include reviewing the number of search results returned in response to the item search request for the item of interest, referred to herein as a search count. In the case of the movie example, the number of search results may include the movie in all formats, editions, etc. Alternatively, the number of search results may include search results for the movie in a specific form (e.g., a specific release, a specific format, etc.). Items of interest having a search count less than a selected number may be identified as benefiting from additional sources, as a relatively low number of search results are provided to the user and providing the item of interest from additional sources may increase the number of provided search results regarding the item of interest and may increase the likelihood of user purchase. In contrast, items of interest having greater than the selected number of search requests may not be identified as benefiting from additional sources, as a relatively high number of search results are provided to the user and adding additional sources to increase the number of search results provided to the user may not increase the likelihood of user purchase.

In an embodiment, upon identifying that an item of interest may benefit from additional sources, the source identification service may further identify sources capable of providing the item of interest. In additional embodiments, the source identification service may offer identified sources the opportunity to provide the item of interest on the network-based service. Sources may be identified by submitting a search to a network-based information source using keywords representative of the item of interest. This search may be referred to herein as a sourcing search. Examples of network-based information sources may include, but are not limited to, search engines, network-based auctions, network-based retailers, and network-based business and/or service listings.

In certain embodiments, the search results returned from the sourcing search may include Uniform Resource Locators (URLs) for respective sources.

Search results returned from the sourcing search may be provided to the source identification service for further processing. In one embodiment, the source identification service may determine a score for each source returned in response to the sourcing search. Returned sources having a score greater than or equal to a threshold value may be considered as potential sources for the item of interest and considered further, while returned sources having a score less than the threshold value may be removed from additional consideration.

As discussed in greater detail below, the source scores may be generated based upon selected parameters pertaining to the respective returned sources, referred to herein as sourcing parameters. In one embodiment, the sourcing parameters may include a measurement of the relative importance of the returned source, as established by a selected network-based information resource (e.g., a search engine). This sourcing parameter may be referred to herein as a source rank. In another embodiment, the sourcing parameters may include an estimate of the number of the items offered for sale by the returned source. This sourcing parameter may be referred to herein as a SKU estimate. In a further embodiment, the sourcing parameters may include an estimate of the number of users employing the returned source (e.g., the number of viewers requesting web pages hosted by the URL of the returned source). This sourcing parameter may be referred to herein as a source utilization estimate. In an additional embodiment, the sourcing parameters may include a normalized frequency at which the returned source appears in the sourcing search. This sourcing parameter may be referred to herein as a query rank. In a further embodiment, the sourcing parameters may include a measure of the desirability of the payment mechanism requested by the source. In an additional embodiment, the sourcing parameters may include a measure of the desirability of the category in which the source is classified. In certain embodiments, two or more of these sourcing parameters may be employed generate the source score. In one embodiment, the sourcing parameters may be averaged in a selected fashion to provide the respective source scores for returned sources. It may be understood, however, that greater or fewer of the sourcing parameters may be employed without limit for generating the source score.

In one embodiment, the source identification service may submit one or more queries to a human interaction task system that employs human workers to obtain selected information regarding potential sources. The queries, in certain embodiments, may represent questions regarding the potential sources that may be difficult, time consuming, and/or relatively expensive to answer using a computing device alone.

The queries may include, but are not limited to, one or more source URLs for potential sources and one or more questions regarding the respective potential sources that the human interaction task system is to answer. Examples of the questions may include, but are not limited to, what is the source contact information, is a potential source a network-based retailer (e.g., e-commerce retailer), does the potential source fall within a selected category or categories, and what is the currency desired by the potential source. Additional information may be provided to the human interaction task system, as necessary, for addressing the questions. For example, when determining whether a potential source falls within a selected category or categories, the human interaction task system may be provided with the selected category or categories. Query responses may be returned to the source identification service for additional processing.

In an embodiment, the source identification service may filter potential sources from further consideration using, at least in part, the answers returned by the human interaction task system. In one embodiment, filtering may include removing potential sources that are repeated (e.g., same source name and/or source contact information). In this manner, the same potential source may not be considered more than once. In another embodiment, filtering may include removing potential sources that have previously refused an offer to provide the item of interest on the network-based service from the source identification service. As discussed in greater detail below, potential sources that have refused an offer from the source identification service within a selected duration of time may be removed from further consideration by the source identification service. In an additional embodiment, potential sources may be removed based upon selected biographic information of the source (e.g., geographic location of the source, currency accepted by the potential source). Such filtering of the potential sources may reflect a determination that sellers outside a selected geographic region may present undesired logistical challenges in delivery of the item of interest (e.g., time and/or added shipping costs for potential sources based in another country, currency fluxuations). In additional embodiments, potential sources may be removed from consideration based upon a determination that they are not commercial sellers (e.g., e-commerce retailers). This determination may reflect a desire to solicit sources which are businesses offering the item of interest in volume, not individuals selling singular goods.

Following filtering of the potential sources, the source identification service may contact one or more of the remaining potential sources using the contact information obtained for the potential sources by the human interaction task system. The contact may include an offer to provide the selected item of interest on the network-based service. The contact may be delivered through mechanisms including, but are not limited to, telephone calls, mail delivery, and electronic mail messages. Upon receiving a response from a potential source, or determining that no response is forthcoming from a potential source, the source identification service may process the response. In an example, an affirmative response from a selected source to the offer may result in the item of interest being provided on the network-based service from the selected source. In another example, a negative response or lack of a response to the offer from the selected source may result in the selected source being removed from consideration by the source identification service for further offers for a selected time period.

Figure 1:
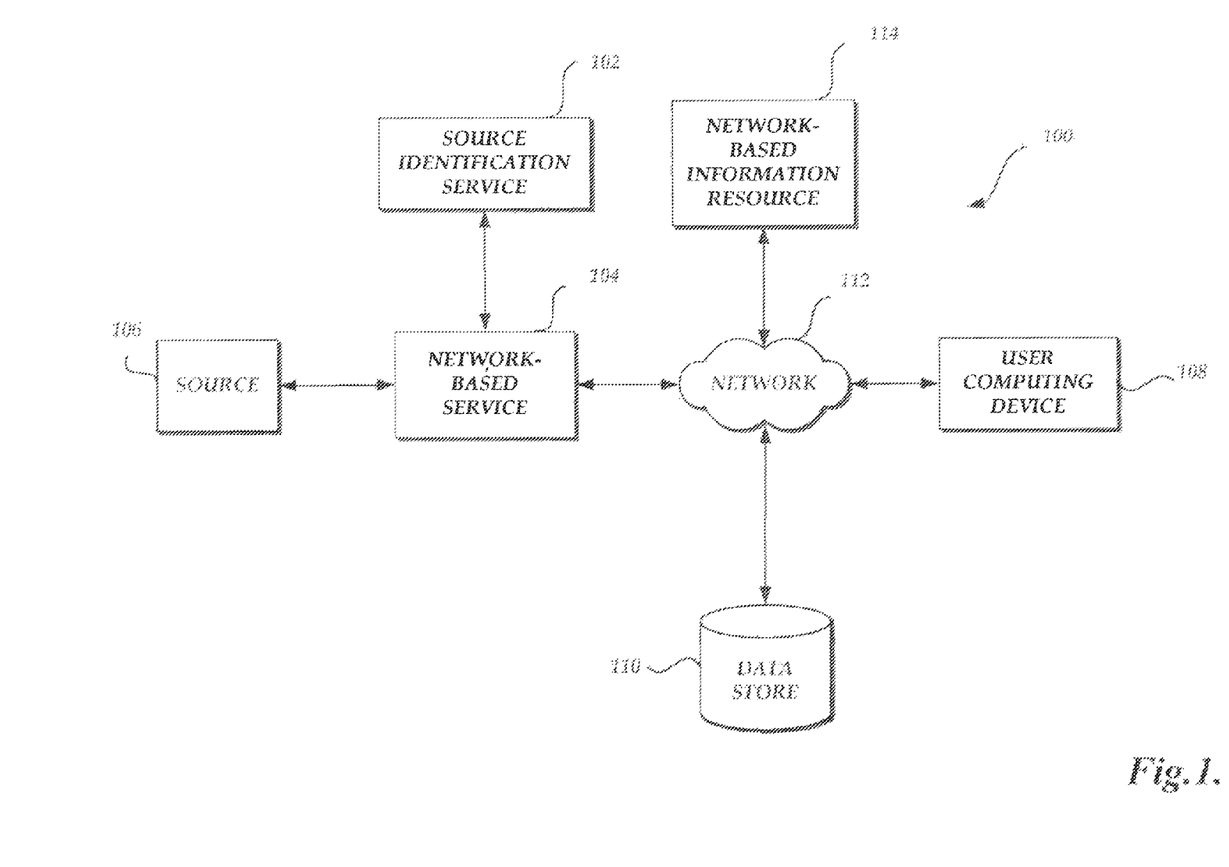
FIG. 1 is a schematic block diagram depicting an illustrative operating environment in which a source identification service identifies items of interest that may benefit from additional sources and further identifies sources to provide the items of interest.

With reference to FIG. 1, an illustrative operating environment 100 is shown, including a source identification service 102 in communication with a network-based service 104 and one or more sources 106. In certain embodiments, the network-based service 104 may offer one or more items for sale, the items for sale being provided by network-based service 104 or provided by the sources 106 on the network-based service 104.

The source identification service 102 may identify items presently offered or desired to be offered by the network-based service 104 that may benefit from being provided by additional sources 106. The sources 106 may include one or more of sellers that offer selected items for purchase and producers of goods and/or services (e.g., manufacturers, service providers). The sources 106 may further include one or more of sources that already provide items of interest on the network-based service 104 as well as sources that do not provide items of interest on the network-based service 104. Sources 106 may be considered for providing items of interest on the network-based service 104 by the source identification service 102. In certain embodiments, the network-based service 104 may request sources 106 for an item of interest based upon received requests for information regarding the item of interest. As described in greater detail below, requests for items of interest may be submitted by a user employing his or her user computing device 108. The network-based service 104 may receive the request from the user computing device 108 and provide item search results in response to the request.

The source identification service 102 may be in further communication with one or more data stores, represented by data store 110. The data store 110 may maintain information regarding items that are provided by a selected network-based service 104, as well as items that are provided on the network-based service by sources 106. It may be understood that data store 110 may include network-based storage capable of communicating with any component of the system 100 (e.g., source identification service 102, network-based service 104, etc) via a network 112. The data store 110 may further include storage that is in local communication with any component of the system 100.

The source identification service 102 may further identify sources 106 capable of providing the selected item of interest and present offers to sources 106 to provide the selected item of interest via the network-based service 104. In certain embodiments, the source identification service 102 may perform a sourcing search that employs selected keywords using a network-based information resource 114 capable of receiving search queries and providing search results responsive to a received search query.

Search results, including one or more sources for the item of interest, may be returned to the source identification service 102. In response to receipt of the search results, the source identification service 102 may obtain information regarding the sources identified in the search results and generate a source score for each search result. Search results assigned a score greater than a selected value may be considered as potential sources for the item of interest and further filtered according to one or more selected criteria. The source identification service 102 may transmit one or more offers to remaining potential sources 106 inviting the potential sources to offer the item of interest for sale on the network-based service 104. The source identification service 102 may further process responses returned from the potential sources 106. Sources 106 agreeing to provide the item of interest on the network-based service 104 may be stored in the data store 110 and the items provided by the agreeing sources may be retrieved in response to user requests for information regarding items of interest from the network-based service 104.

The user computing device 108 may include any computing devices, such as a laptop or tablet computer, personal computer, personal digital assistant (PDA), hybrid PDA/mobile phone, mobile phone, electronic book reader, set-top box, camera, digital media player, and the like.

The network-based information resource 114 may include any computing device capable of receiving a query from the source identification service 102 and returning a response. Examples of network-based information resources 114 may include, but are not limited to, search engines, network-based auctions, network-based services, network-based business and/or service listings, and the like.

In one embodiment, the source identification service 102 may communicate with the user computing device 108 and network-based information resource 114 via communication network 112, such as the Internet, or a communication link.

Those skilled in the art will appreciate that the network 112 may be any wired network, wireless network or combination thereof. In addition, the network 112 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

It will be recognized that many of the components described below are optional and that embodiments of the environment 100 may or may not combine components. Furthermore, components need not be distinct or discrete. Components may also be reorganized in the environment 100. For example, the source identification service 102 and the network-based service 104 may be represented in a single physical server or computing system containing all of the subsystems described below or, alternatively, may be split into multiple physical servers.

The source identification service 102, user computing device 108, and network-based service 104 may each be embodied in a plurality of components, each executing an instance of the respective source identification service 102, user computing device 108, and network-based service 104. A server or other computing system implementing the source identification service 102, user computing device 108, and network-based service 104 may include a network interface, memory, processing unit, and computer readable medium drive, all of which may communicate with each other by way of a communication bus. The network interface may provide connectivity over the network 112 and/or other networks or computer systems. The processing unit may communicate to and from memory containing program instructions that the processing unit executes in order to operate the source identification service 102, user computing device 108, and network-based service 104. The memory generally includes RAM, ROM, and/or other persistent and/or auxiliary memory.

As noted above, the item of interest to the user may be any good or service. Accordingly, the item of interest may include objects (e.g., articles of manufacture, plant, animals, etc.), events (e.g., games, concerts, movie, etc.), and services (e.g., travel services, financial services, residential services, etc.).

Figure 2:
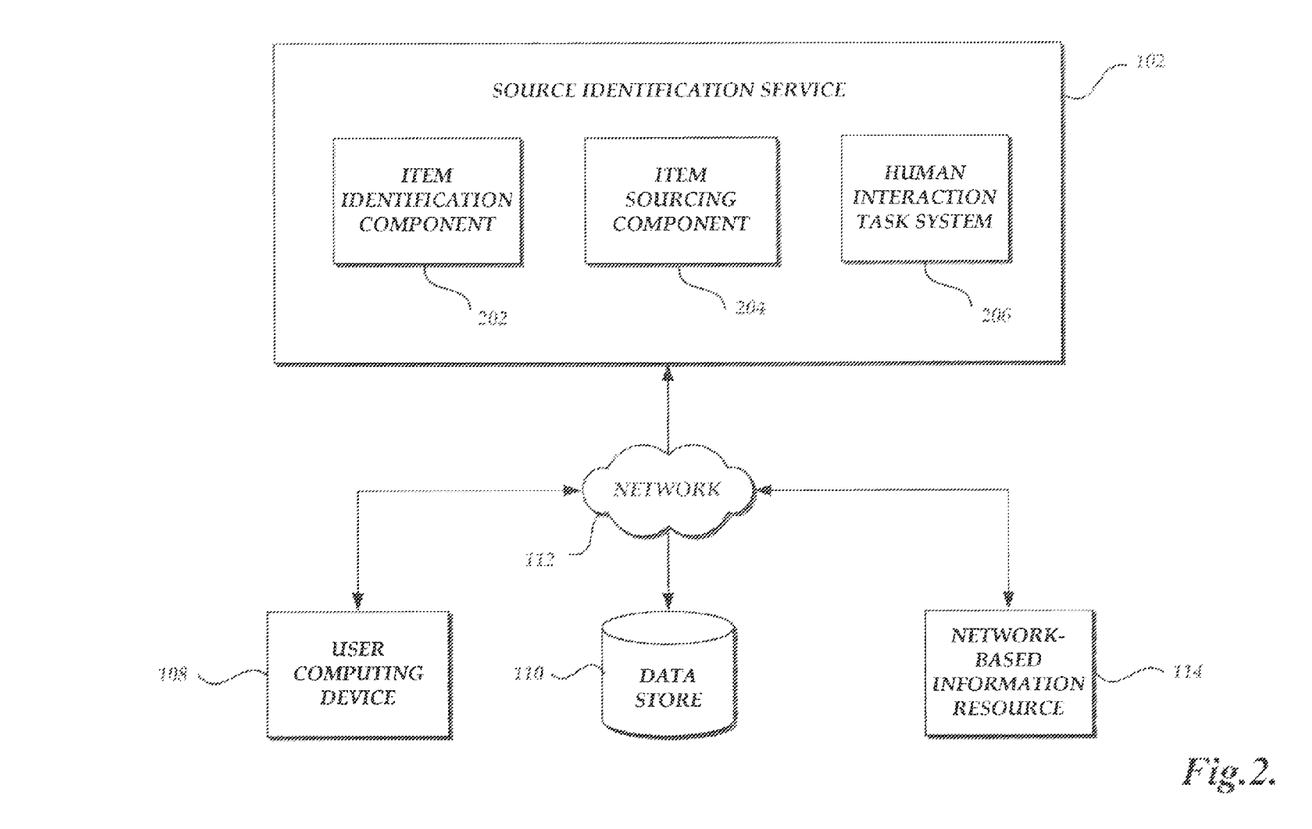
FIG. 2 is a schematic block diagram of certain illustrative components implemented by the source identification service shown in FIG. 1.

With reference to FIG. 2, illustrative components of the source identification service 102 will now be addressed. In one embodiment, the source identification service 102 includes an item identification component 202 for receiving requests to identify items that may benefit from additional sources. In certain embodiments, the requests may be received from the network-based service 104.

A request to identify items that may benefit from additional sources received by the item identification component 202 may include request information. The request information may include one or more identifiers for the item of interest. Examples of such identifiers may include, but are not limited to, a name, model, a manufacturer, a manufacturer product number, and any other information that may identify the item of interest.

The request information may further include information that correlates users and/or their user computing device 108 that submit a query to the network-based service 104 and the identifiers for the item of interest. In this manner, users and/or their user computing devices 108 may be matched up with submitted item information requests and item detail requests. In one embodiment, the correlating information may include one or more cookies or other files that may be employed for tracking the user's identity and/or the user computing device 108. In another embodiment, the correlating information may include an Internet Protocol (IP) address that identifies the user computing device 108. In additional embodiments, the correlating information may include the name of the user requesting the search. For example, the user may perform a login process that identifies the user prior to submission of the request.

The network-based service 104 may obtain information to respond to item information requests from the data store 110. The data store 110 may include information regarding items both offered directly by the selected network-based service 104 and items offered indirectly by the network-based service 104 via one or more sources 106. The data store 110 may return at least a portion of the information regarding the item of interest maintained within the data store 110 (e.g., name, price, etc.).

For example, as discussed above, if the item of interest is a movie, a user employing his or her user computing device 108 may submit a movie name to the network-based service 104. In response, the network-based service 104 may provide search results in response to the item information request. In an example, the search results for the movie may include product offerings for the movie, such as different formats of the movie offered by the network-based service 104 (e.g., VHS, DVD, Blu-Ray, downloadable electronic formats, and the like). Product offerings for the movie may further include different versions of the movie (e.g., a theatrical release, a director's cut, a re-mastered edition, an anniversary edition, a collector's edition, etc.). The product offerings for the movie may additionally include any of the above format and versions available directly through the network-based service 104 and provided by sources 106 via the network-based service 104.

In other embodiments, the data store 110 may not maintain any information regarding the item of interest. For example, the item of interest may be a rare item or an item not otherwise carried for sale by the network-based service 104 (e.g., an item in a category stocked by the network-based retailer 104). In this case, the data store 110 may return a search result indicating the absence of a product offering for the item of interest. The search result may be stored for later use by the item identification component 202, as discussed below.

In response to receipt of the search results, the user may employ their user computing device 108 to select a specific item from the search results so as to receive detailed information regarding the selected item of interest. In an embodiment, the request for detailed item information may be received by the network-based service 104. The network-based service 104 may further retrieve the detailed item information from the data store 110, and provide the detailed item information to the user computing device 108. For example, continuing the example above for an item of interest including a movie, the detailed item information may include bibliographic information, reviews, an option to bookmark the movie (e.g., place the selected item in a wish list of the user), and an option to purchase the movie. Information regarding user selections of the item of interest may be further stored by the network-based service 104 in the data store 110 and provided to the item identification component 202 with the request to identify whether the item of interest may benefit from additional sources 106.

The item identification component 202 may employ the user selection information and/or the search results for the item of interest in order to identify whether the item of interest may benefit from additional sources. In an embodiment, the user selection information may be employed to determine the degree to which the detailed item information has been accessed, which may be a measure of the popularity of the item. In one embodiment, the popularity of the selected item of interest may include an item request rate. To determine the item request rate for a selected item of interest, the item identification component 202 may review the number of requests submitted to the network-based service 104 for detailed item information regarding the selected item of interest. For example, one or more of the item identification component 202 and the data store 110 may maintain and/or update a record of each time detailed item information regarding the selected item of interest is requested. The item request rate may be further computed by dividing the number of requests for detailed item information regarding the selected item of interest by a selected time duration.

In another embodiment, the popularity of the selected item of interest may include a user request count. For example, user request count may include the number of unique users requesting detailed item information. Unique users may be identified through the correlating information discussed above.

In a further embodiment, the popularity of the selected item of interest may include an item access time. In order to determine the item access time, the item identification component 202 may measure and/or estimate the time over which the detailed information regarding the selected item of interest is accessed (e.g., retrieved and/or viewed) by users employing his or her computing devices 108. In one embodiment, the item access time may be provided by an application residing on the user computing device 108 that tracks user behavior (e.g., a browser toolbar). This information may be transmitted to the network-based service 104 and stored in the data store 110. In another embodiment, if a direct measurement of the item access time is not available, proxy estimates for the item access time may be determined. For example, item access time may be estimated by measuring the time between transmission of the detailed item information to the user computing device 108 and submission of a new request for item information to the network-based service 104. It may be understood that the above described mechanisms for determining item access time are not exhaustive and that other mechanisms for measuring the item access time, as known in the art, may be employed without limit.

In the case of each of the above described popularities of the selected item of interest, the determined popularity may be compared to respective threshold values by the item identification component 202 to identify whether the selected item of interest is to be provided by additional sources 106. In an example, if the popularity determined for the selected item of interest is greater than or equal to the respective threshold value for the popularity, the selected item of interest may be identified for receiving additional sources 106. This identification reflects the consideration that a popularity greater than the respective threshold value reflects that the selected item of interest is relatively popular and may benefit from additional sources. That is to say, highly popular items may be subject to high demand and the ability to provide a large number of options for the item of interest via the network-based service 104 may increase the likelihood of a user purchase of the selected item of interest.

If the popularity of the selected item of interest is determined to be less than the respective threshold value by the item identification component 202, however, the selected item of interest may not be identified to be provided by additional sources 106. This lack of identification reflects the consideration that the selected item of interest has not generated sufficient user interest to warrant providing the selected item of interest using additional source 106.

In an additional embodiment, the item search results returned in response to the user's initial request for information regarding the item of interest (search count) may be employed by the item identification component 202 to identify whether the item of interest is to be provided by additional sources 106. For example, the item identification component 202 may compare the search count to a selected value. If the search count for the item of interest is less than a selected number, the item of interest may be identified to be provided by additional sources 106. This identification reflects the consideration that additional search options for the item of interest may be beneficial. For example, certain items of interest may be rare (e.g., limited editions, collectables, and the like) and limited supplies and/or options may be available. Alternatively, the item of interest may not be provided by the network-based service 104. By identifying the item of interest to be provided by additional sources 106, the supply and/or options for the item of interest may be increased, improving the likelihood that the user may purchase the item of interest from the network-based service 104.

If the search count for the item of interest is greater than or equal to the selected number of search results, the selected item of interest may not be identified to be provided by additional sources 106 by the item identification component 202. This lack of identification reflects the consideration that sufficient options and/or supply for the item of interest are provided by the network-based service and that recruiting additional sources for the item of interest is not warranted.

Upon identifying that an item of interest is to be provided by additional sources, the item identification component 202 may provide the identified item of interest to an item sourcing component 204 in order to identify sources 106 for the item of interest. In one aspect, the item sourcing component 204 may identify sources for the item of interest by performing a sourcing search for sources using the network-based information source 114. The sourcing search may be performed using one or more keywords pertaining to the item of interest. Keywords for an item of interest may be provided to the item sourcing component 204 and/or retrieved by the item sourcing component 204 (e.g., from data store 110).

In embodiments where the item of interest is already provided by the network-based service 104, the keywords may be derived from search query terms entered by users that are associated with the item of interest. For example, assume the item of interest is a new compact disc (CD) by a selected artist. Users searching on the terms "CD," "artist," and "album name" may cause the term "album name" to be associated with searches on "CD" and "artist." Previously provided items of interest may be characterized, for example, as items of interest which have been provided by the network-based service for greater than a selected duration of time. In certain examples, the data store 110 may maintain a record of the duration of time items of interest have been provided by the network-based service 104.

In embodiments where the item of interest is a new item provided by the network-based service 104, the keywords may be derived from a list of keywords provided by an operator of the source identification service 102. The list of keywords may include any keywords expected for an item within the category of the item of interest. For example, if the item of interest is a book, expected keywords may include bibliographic information (e.g., name, author, catalog classification, ISBN number), genre (e.g., fiction, non-fiction, subject), and the like. New items may be characterized, for example, as items of interest which have been provided by the network-based service for less than a selected duration of time. The selected duration of time may include no time, reflecting items of interest which have not yet been provided by the network-based service 104.

The keywords may be submitted to the network-based information resource 114 by the item sourcing component 204 in order to return sources to be considered for providing the item of interest. As discussed above, the network-based information resource 114 may receive the keywords and return results for this sourcing search. The sourcing search results may include sources 106 capable of providing the item of interest to the item sourcing component 204. The search results may include a URL for each source, the item sourcing component 204 employed to perform the search, and the keywords employed in the sourcing search.

The item sourcing component 204 may further generate a score for each of the sources returned from the sourcing search. The score may be derived from one or more sourcing parameters evaluated for each of the returned sources. In one embodiment, the sourcing parameters may include a measurement of the relative importance of a URL for a returned source (the source rank) on the network. For example, the source identification service 102 may query a selected network-based information resource 114 (e.g., a search engine) regarding the page rank ascribed to the returned source by the network-based information resource 114. It may be understood, however, that other network-based information resources 114 may be employed without limit to determine the source rank.

In another embodiment, the sourcing parameters may include an estimate of the number of the items offered for sale by the returned source (the SKU estimate). In certain embodiments, the item sourcing component 204 may determine the number of web pages hosted by the returned source as a proxy for the number of items offered for sale by the returned source. For example, the item sourcing component 204 may measure the total number of web pages hosted by the returned source by querying one or more network-based information resources 114 (e.g., search engines) regarding the number of web pages indexed by the search engines for the returned source. This number of indexed web pages may be taken as the total number of web pages hosted by the returned source and, thus, as the SKU estimate.

In a further embodiment, the sourcing parameters may include an estimate of the number of users requesting information from the returned source (the source utilization estimate). In one embodiment, estimates of the number of users requesting information from the returned source may be obtained from a tracking service that monitors network navigation behavior of users employing the network 112. For example, the tracking service may employ a toolbar which is installed on the user computing device 108 of a user. Once installed, the toolbar reports data collected on browsing habits of the user employing the computing device 108. It may be understood that other tracking services known in the art may be employed without limit.

In an additional embodiment, the sourcing parameters may include a normalized frequency at which the returned source appears in the sourcing search, referred to herein as a query rank (the query rank). For example, in one embodiment, the query rank for a returned source may include the ratio of the number of occurrences of the returned source to the number of keywords multiplied by a selected value. The number of occurrences of the returned source may include any search result including the URL of the returned source. In one embodiment, the selected value may be 10,000, however, other values may be selected as necessary.

$$\text{Query Rank} = \left(\frac{\text{Number of Occurances of Potential Source in Sourcing Search}}{\text{Number of Keywords in Sourcing Search}}\right) \times 10,000$$

In further embodiments, other sourcing parameters may be employed in lieu of or in addition to the above identified sourcing parameters. In one example, another sourcing parameter may include a reputation of the returned source. The source reputation may be obtained from a selected network-based information resource 114. For example, the network-based information resource 114 and the query rank may be the source reputation from the network-based auction site. In a further example, another sourcing parameter may include a number of positive recommendations from sources that provide items for offer by the network-based service 104. In a further embodiment, another sourcing parameter may include a measure of the desirability of the payment mechanism requested by the source for purchase of items provided by the source (e.g., cash, check, credit card, and the like). In an additional embodiment, another sourcing parameter may be the desirability of a category to which the source is assigned. For example, used clothing may be an undesirable category while new clothes may be a desirable category.

Each of the sourcing parameters may be converted to a selected numerical scale (e.g., 0 to 10) for ease of generating the sourcing scores for the returned sources. The respective sourcing parameters may be converted into the selected numerical scale through a bucketing or binning process, as needed. In one example, take the selected numerical scale to be 0 to 10. Binning processes may be performed by associating each of the numbers 0 to 10 with a range of values of the respective sourcing parameters. For example, with respect to the SKU estimate, a value of 0 may correspond to about 0 to less than about 100 items available from the returned source, a value of 1 may correspond to about 100 to less than about 1,000 items available from the returned source, a value of 2 may correspond to about 1,000 to less than about 10,000 items available from the returned source, a value of 3 may correspond to about 10,000 to less than about 50,000 items available from the returned source, and so forth for the remaining values 4 through 10. Thus, in this example, a higher sourcing parameter score indicates a larger number of users employing the returned source. It may be understood that these ranges are presented for example purposes and other ranges may be employed to convert the SKU estimate, as necessary.

Similar conversion processes may be performed for the remaining sourcing parameters, where the conversion of sourcing parameters may be performed such that higher sourcing parameter values represent greater relative importance of the returned source, higher numbers of items offered for sale by the returned source, and greater normalized frequency of occurrence in the sourcing search.

After converting the sourcing parameters to a common numerical scale, the sourcing parameters for respective returned sources may be employed to generate the source score for the respective returned sources. In an embodiment, two or more of the sourcing parameters may be employed by averaging the sourcing parameters together. In further embodiments, the average may be a weighted average employing selected weighting parameters for each of the respective sourcing parameters. It may be understood, however, that greater or fewer numbers of the sourcing parameters may be employed in other ways to generate the sourcing scores without limit.

The sourcing scores assigned to respective returned sources may be compared with a selected sourcing threshold value to determine whether a returned source is to be further considered to receive an offer from the item sourcing component 204. In an embodiment, returned sources having sourcing scores higher than or equal to the selected sourcing threshold value may be considered further as potential sources, while returned sources having sourcing scores lower than the selected value may not be considered further. This determination reflects that higher sourcing scores, comparatively, represent higher numbers of users employing the returned source, higher relative importance of the returned source, higher numbers of items offered for sale by the returned source, and/or a higher normalized frequency of occurrence in the sourcing search.

In other embodiments, the trend in the sourcing parameters may be reversed from that described above, with lower sourcing parameter values representing, for example, a larger number of users employing the returned source, greater relative importance of the returned source, higher numbers of items offered for sale by the returned source, and greater normalized frequency of occurrence in the sourcing search. Under these circumstances, sourcing scores lower than or equal to the selected value may considered further, while sourcing scores higher than the selected value may not be considered further.

Potential sources identified for further consideration may be passed to the human interaction task system 206. Embodiments of the human interaction task system 206 are described in U.S. patent application Ser. No. 12/200,822, filed Aug. 28, 2008, entitled, "ENHANCING AND STORING DATA FOR RECALL AND USE" and U.S. patent application Ser. No. 12/623,354, filed Nov. 20, 2009, entitled "ENHANCING AND STORING DATA FOR RECALL AND USE USING USER FEEDBACK," each of which are incorporated by reference in their entirety. Generally described, the human interaction task system 206 receives one or more queries regarding the item of interest, including the URLs of the potential sources, as well as selected questions regarding the potential sources. One or more of the questions submitted to the human interaction task system 206 may be of a nature such that it is relatively faster, easier, and/or more cost effective to answer the questions using a human respondent rather than a computing device. In one aspect, a question submitted to the human interaction task system 206 may regard the contact information for the potential sources. In another aspect, a question submitted to the human interaction task system 206 may be in regards to the price at which the potential source offers the item of interest.

In a further aspect, if the potential source is a new source (e.g., a source 106 that has not previously provided an item of interest for offer the network-based service 104), additional questions may be submitted to the human interaction task system 206 in order to obtain additional information regarding the potential source. In one aspect, the additional questions may regard whether the potential source is an e-commerce site. In a further aspect, the additional requested information may regard the currency the potential source accepts. In an additional aspect, the human interaction task system 206 may be provided with one or more categories that may classify the potential source and the human interaction task system 206 may be further asked whether the potential source falls into one of the provided categories.

The responses returned by the human interaction task system 206 may be employed to filter potential sources from further consideration. In one aspect, potential sources that are determined to not be e-commerce sources (e.g., a business or other volume provider of the item of interest as compared with individuals selling one or a few of the item of interest) by the human interaction task system 206 may be removed from consideration. This filtering operation reflects the consideration that e-commerce sources are preferred over individuals for providing items of interest for the network-based service 104.

In another aspect, potential sources that are determined to accept foreign currencies and/or to be located in foreign countries by the human interaction task system 206 may be removed from consideration. Whether a potential source is foreign is determined with respect to a selected country. This filtering operation reflects that shipping times, shipping costs, exchange rate fluxuations and the like may reduce the benefits of providing items of interest for the network-based service 104.

In a further aspect, potential sources determined to not to fall within the categories provided to the human interaction task system 206 may be removed from consideration. This filtering operation may reflect that some potential sources identified in the sourcing search may not be relevant potential sources. For example, assuming the item of interest is an exercise ball, a category for the item of interest provided to the human interaction task system 206 may include exercise equipment. A potential source offering sporting goods may be identified to fall within the category of exercise equipment while a potential source offering exercise balls for pets may be identified to fall within the category of pet supplies, not the category of exercise equipment. Therefore, the potential source supplying pet supplies may be removed from consideration.

In additional embodiments, duplicate repetitions of potential sources may be removed from consideration. This filtering operation reflects that a potential source may be returned multiple times in response to the sourcing search. However, the potential source need only be considered a single time for providing items of interest for the network-based service 104.

The contact information obtained by the human interaction task system 206 may be passed to the item sourcing component 204 in order to contact potential sources that remain under consideration after the filtering operations described above. In an embodiment, contacts between the item sourcing component 204 and the potential source may include, but are not limited to, electronic mail messages, telephone messages, mail delivery services, and the like. The contact may further include an offer for the potential source 106 to provide items of interest for offer by the network-based service 104. The contact may further include financial terms of such an arrangement.

The item sourcing component 204 may be configured to receive responses from the potential source 106. In one embodiment, an acceptance from the potential source to the contact may result in items of interest provided by the network-based service 104 being offered by the network-based service 104. In another embodiment, an acceptance from the potential source to the contact may result in the potential source 106 being removed from consideration from all sourcing searches for a selected period of time. In a further embodiment, lack of a response from the potential source 106 to the contact within a selected duration of time may be considered an effective refusal.

Figure 3:
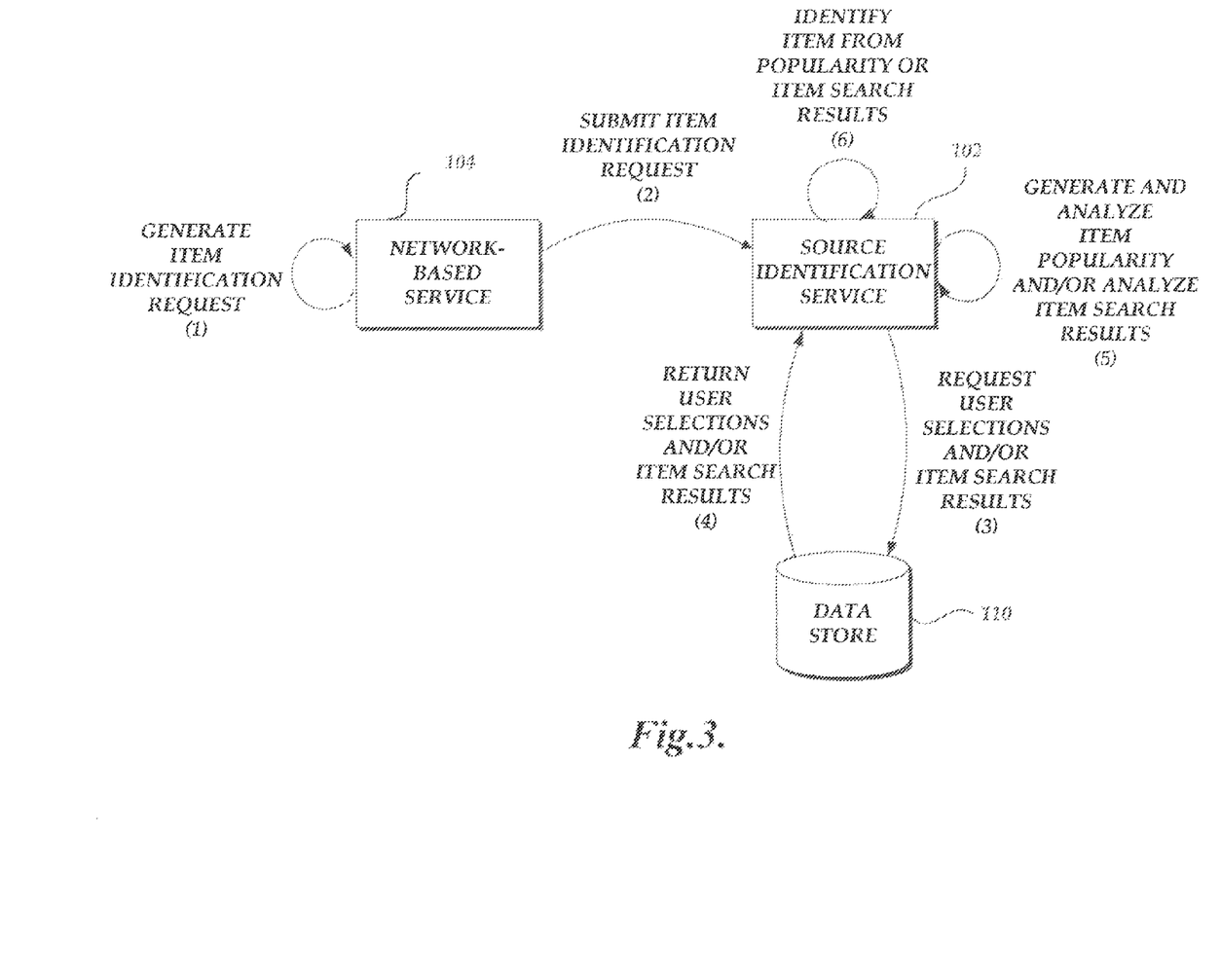
FIG. 3 is a schematic block diagram of the source identification service of FIG. 1 receiving a request from the network-based service to identify whether an item of interest may benefit from additional sources.

FIG. 3 is a schematic block diagram illustrating the source identification service 102 receiving a request from the network-based service 104 to identify whether the item of interest is to be provided by additional sources 106. In an embodiment, the source identification service 102 may receive an item information request from the network-based service 104. In response to receipt of the request, the source information service 102 may obtain the search results for the item of interest and/or user selection information for the item of interest stored in the data store 110.

The source identification service 102 may further employ one or more of the popularity of the item of interest (e.g., item request rate, item access time, user request count) and/or the search results for the item of interest to identify if the item of interest is to be provided by additional sources 106. For example, the source identification service 102 may obtain the search results and/or the user selection information for the item of interest from the data store 110. In another embodiment, the source identification service 102 may obtain the search results and/or user selection information with the request from the network-based service 104. Popularity may be generated from the user selection information, as discussed above. At least one of a selected measure of popularity for the item of interest or the number of search results returned for the item of interest may be compared with a selected value. An item of interest having a popularity and/or number of search results greater than the selected value may be identified as benefiting from additional sources 106, while an item of interest having a popularity and/or number of search results less than the selected value may not be identified as benefiting from additional sources 106.

Figure 4A:
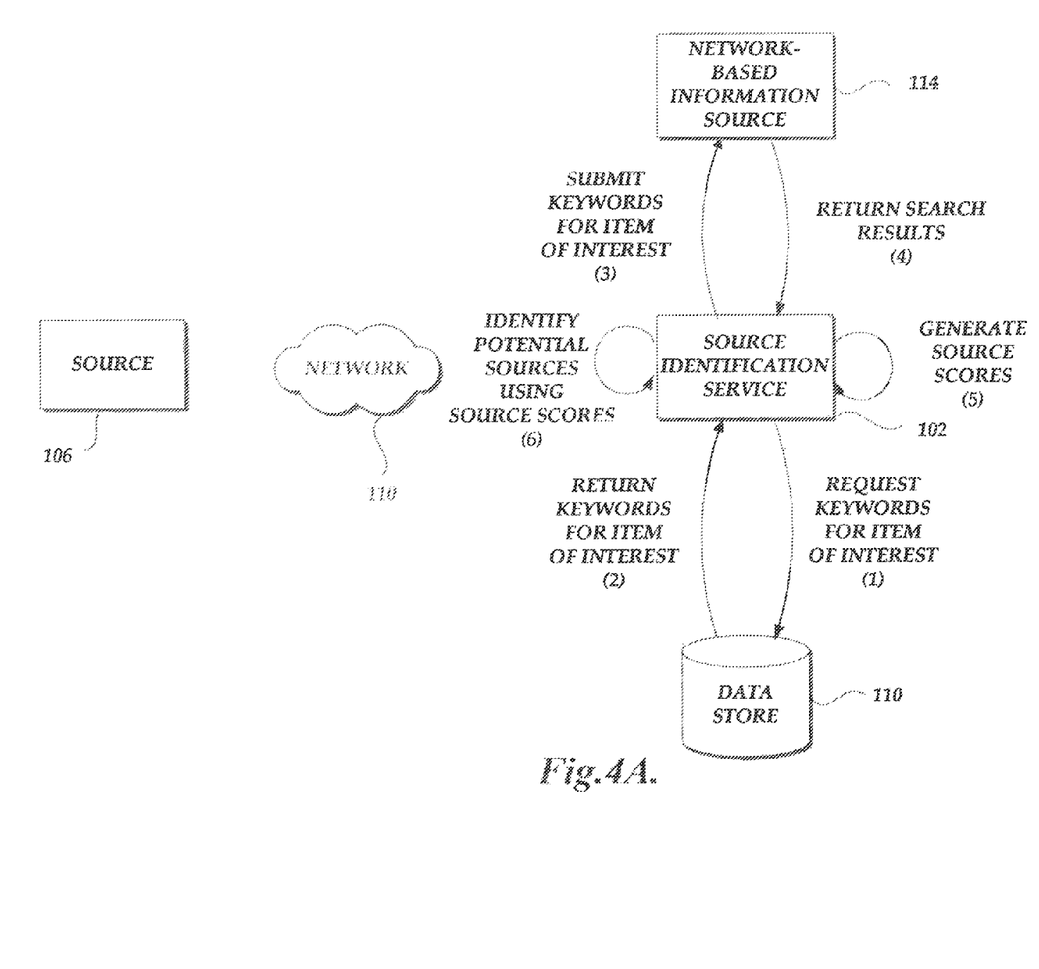
FIG. 4A is a schematic block diagram of the source identification service of FIG. 1 identifying sources for the item of interest.

Having identified an item of interest as benefiting from additional sources, the source identification service 102 may further identify additional sources 106 for the item of interest. FIG. 4A is a schematic block diagram of the source identification service 102 generating source scores by which sources 106 may be evaluated. The source identification service 102 may obtain one or more keywords for the item of interest from the data store 110. The keywords may be submitted a network-based information source 114 in order to search for potential sources. Search results, including sources for the item of interest, may be returned to the source identification service 102. The source identification service 102 may generate source scores for each of the sources returned in the search results, as discussed above.

The generated source scores may be further employed by the source identification service 102 to determine which of the sources returned in the sourcing search of the network-based information source 114 may be considered as potential sources. For example, source scores for respective sources 106 may be compared to a threshold value. Those sources having a source score which satisfy a selected criterion with respect to the threshold value (greater than or equal to in certain embodiments) may be considered potential sources for the item of interest and subjected to further consideration.

Figure 4B:
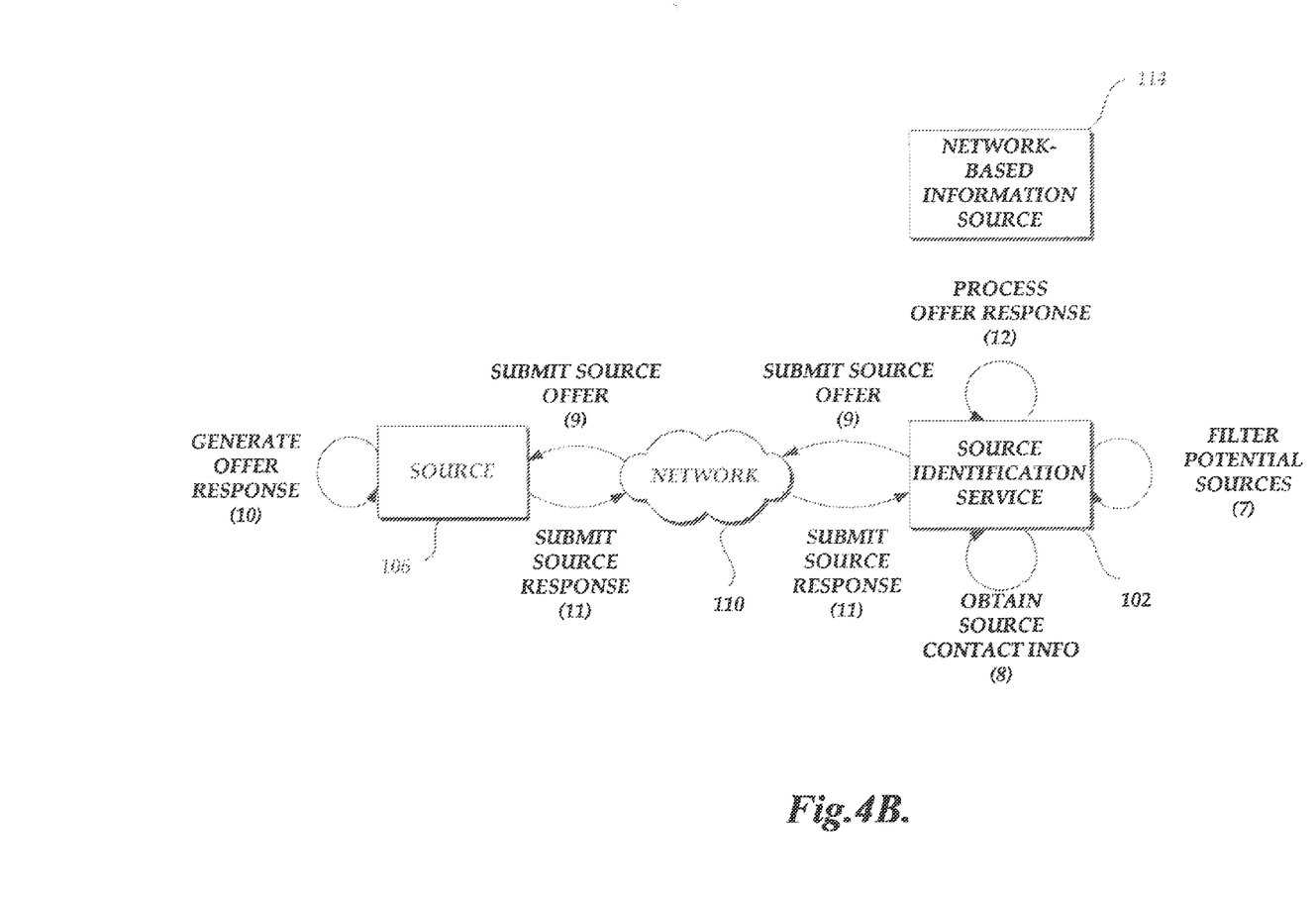
FIG. 4B is a schematic block diagram of the source identification service of FIG. 1 providing a sourcing offer to an identified source.

FIG. 4B is a schematic block diagram of the source identification service 102 in which the source identification service 102 identifies sources 106 to provide the item of interest. In one aspect, potential sources may be further subjected to one or more filtering operations to remove potential sources that possess selected characteristics from consideration. As discussed above, examples of such characteristics may include desired payment in a foreign currency, location in a foreign country, duplicative sources, not e-commerce sites. In certain embodiments, one or more of the selected characteristics may be determined by the human interaction task system 204.

Contact information for potential sources 106 still under consideration after the filtering operations may further obtained. Upon obtaining the contact information, potential sources 106 may be given an offer by the source identification service 102 to provide the item of interest via the network-based service 104. The source offer may be transmitted from the source identification service 102 to a potential source 106 by any communication method. In response, the potential source 106 may consider and submit a response that accepts or rejects the offer. Sources which fail to respond to the offer within a selected time period may be considered as having rejecting the source offer.

The source identification service 102 may receive the source response and process the source response accordingly. For example, acceptance by a selected source may result in the item of interest, provided by the selected source, being made available on the network-based service 104. In another example, rejection by a selected source may result in the source identification service 102 not considering the selected source to provide items of interest for a selected future time period (e.g., three months, six months, etc.)

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for identifying sources to provide items, the system comprising:
    one or more data stores; and
    one or more computing devices in communication with the data stores, the one or more computing devices configured to:
        receive a request to identify a potential source for an item that is offered by a number of sources on a network-based service, wherein the number of sources is less than a threshold, and wherein the threshold is determined at least in part by analyzing statistical information relating to searches performed by a plurality of users of the network-based service;
        obtain one or more keywords pertaining to the item from the data store;
        obtain search results in response to submission of the received keywords for the item to a network-based information resource, the search results comprising one or more sources for the item;
        generate a source score for each of the sources returned by the search results;
        identify a source from the returned search results as the potential source if its source score satisfies a selected numerical criterion;
        obtain contact information for the potential source;
        transmit an offer inviting the potential source to provide the item on the network-based service using the obtained contact information; and
        add an entry to at least one of the data stores after the transmitted offer is accepted, the entry indicating that the potential source provides the item on the network-based service.

2. The system of claim 1, wherein the source score for each of the obtained sources comprises at least two of the following:
    a source rank comprising a measurement of the relative importance of the obtained source on a network;
    an SKU estimate comprising an estimate of the number of items offered for sale by the obtained source;
    a source utilization estimate comprising an estimate of the number of users requesting information from the obtained source; and
    a query rank comprising a frequency at which the obtained source appears in the search results.

3. The system of claim 2, wherein the source rank is obtained from a network-based information resource comprising a search engine.

4. A computer-implemented method for identifying sources to provide items, the method comprising:
    under control of one or more computing devices configured with specific computer-executable instructions:
        receiving a request to identify a potential source for an item that is offered by a number of sources on a network-based service, wherein the number of sources is less than a threshold, and wherein the threshold is determined at least in part by analyzing data regarding interactions between a plurality of users and the network-based service;
        identifying one or more sources capable of providing the item;
        generating a source score for each of the identified sources, wherein the source score comprises at least two of:
            a source rank comprising a measurement of the relative importance of an identified source;
            an SKU estimate comprising an estimate of the number of items offered for sale by the identified source;
            a source utilization estimate comprising an estimate of the number of users requesting information from the identified source;
            a measurement of desirability of a payment method accepted by the source; and
            a measurement of desirability of a category in which the source is classified; and selecting at least one of the identified sources having a source score greater than a predetermined value as the potential source to provide the item on the network-based service.

5. The computer-implemented method of claim 4, further comprising:
transmitting an offer inviting the potential source to provide the item on the network-based service; and
storing information indicating that the potential source provides the item on the network-based service, after the potential source accepts the transmitted offer.

6. The computer-implemented method of claim 5, wherein said storing information is performed unless one or more of the following is true:
the source is a duplicate of another source that provides the item on the network-based service;
the source prefers payment for items in a currency different than that of the selected network-based service;
the source has previously refused to accept a transmitted offer; and
the source is not an e-commerce site.

7. The computer-implemented method of claim 4, wherein identifying the one or more sources comprises submitting a search to a network-based search engine using one or more keywords pertaining to the item and receiving attendant search results.

8. The computer-implemented method of claim 4, further comprising obtaining the source rank from a network-based search engine based upon a URL of the source.

9. The computer-implemented method of claim 4, wherein the SKU estimate comprises the number of web pages hosted by the source.

10. The computer-implemented method of claim 4, wherein the source utilization estimate is obtained from a network-information resource that tracks network-navigation behavior of users.

11. The computer-implemented method of claim 4, further comprising requesting contact information for a source from a human interaction task system comprising one or more computing devices configured to electronically assign tasks to one or more human workers.

12. A system for identifying sources for items, the system comprising:
a data store configured to maintain information regarding one or more items; and
a computing device in communication with the data store, the computing device configured to:
receive a request to identify a potential source for an item that is offered by a number of sources on a network-based service, wherein the number of sources is less than a threshold, and wherein the threshold is determined at least in part by analyzing data regarding interactions between a plurality of users and the network-based service;
identify one or more sources capable of providing the item; and
generate a source score for each of the identified sources, wherein the source score comprises at least two of:
a source rank comprising a measurement of the relative importance of an identified source;
an SKU estimate comprising an estimate of the number of items offered for sale by the identified source;
a source utilization estimate comprising an estimate of the number of users requesting information from the identified source;
a measurement of desirability of a payment method accepted by the source; and
a measurement of desirability of a category in which the source is classified; and
select at least one of the identified sources having a source score greater than a predetermined value as the potential source to provide the item on the network-based service.

13. The system of claim 12, wherein the computing device is further configured to:
transmit an offer inviting the potential source to provide the item on the network-based service; and
store information in the data store indicating that the potential source provides the item on the network-based service, after the potential source accepts the transmitted offer.

14. The system of claim 13, wherein the computing device is further configured to store said information in the data store unless one or more of the following is true:
the source is a duplicate of another source that provides the item;
the source does not accept payment for the item in a currency accepted by the network-based service;
the source has previously refused to accept a transmitted offer; and
the source is not an e-commerce site.

15. The system of claim 12, wherein the computing device is further configured to identify the one or more sources by submitting a search to a network-based search engine using one or more keywords pertaining to the item and receiving attendant search results.

16. The system of claim 12, wherein the computing device is further configured to obtain the source rank from a network-based search engine based upon a URL of the source.

17. The system of claim 12, wherein the SKU estimate comprises the number of web pages hosted by the source.

18. The system of claim 12, wherein the source utilization estimate is obtained from a network-information resource that tracks network-navigation behavior of users.

19. The system of claim 12, wherein the computing device is further configured to request contact information for a source from a human interaction task system comprising one or more computing devices configured to electronically assign tasks to one or more human workers.

20. A non-transitory computer-readable storage medium having instructions stored thereon, wherein the instructions, when executed by a computing apparatus, cause the computing apparatus to:
receive a request to identify a potential source for an item that is offered by a number of sources on a network-based service, wherein the number of sources is less than a threshold, and wherein the threshold is determined at least in part by analyzing statistical information relating to searches performed by a plurality of users of the network-based service;
obtain one or more keywords pertaining to the item from a data store;
obtain search results in response to submission of the received keywords for the item to a network-based information resource, the search results comprising one or more sources for the item;
generate a source score for each of the sources returned by the search results;
identify a source from the returned search results as the potential source if its source score satisfies a selected numerical criterion;
obtain contact information for the potential source;

transmit an offer inviting the potential source to provide the item on the network-based service using the obtained contact information; and add an entry to a data store after the transmitted offer is accepted, the entry indicating that the potential source provides the item on the network-based service.

21. The non-transitory computer-readable storage medium of claim 20, wherein the source score for each of the obtained sources comprises at least two of:

a source rank comprising a measurement of the relative importance of the obtained source on a network;

an SKU estimate comprising an estimate of the number of items offered for sale by the obtained source;

a source utilization estimate comprising an estimate of the number of users requesting information from the obtained source; and a query rank comprising a frequency at which the obtained source appears in the search results.

22. The non-transitory computer-readable storage medium of claim 21, wherein the source rank comprises a source rank obtained from a network-based information resource comprising a search engine.

23. A computer-implemented method for identifying sources for items, the method comprising:

under control of one or more computing devices configured with specific computer-executable instructions:

receiving a request to identify a potential source for an item that is offered by a number of sources on a network-based service, wherein the number of sources is less than a threshold, and wherein the threshold is determined at least in part by analyzing statistical information relating to searches performed by a plurality of users of the network-based service;

obtaining one or more keywords pertaining to the item from a data store;

obtaining search results in response to submission of the received keywords for the item to a network-based information resource, the search results comprising one or more sources for the item;

generating a source score for each of the sources returned by the search results;

identifying a source from the returned search results as the potential source if its source score satisfies a selected numerical criterion;

obtaining contact information for the potential source;

transmitting an offer inviting the potential source to provide the item on the network-based service using the obtained contact information; and adding an entry to a data store after the transmitted offer is accepted, the entry indicating that the potential source provides the item on the network-based service.

24. The computer-implemented method of claim 23, wherein the source score for each of the obtained sources comprises at least two of the following:

a source rank comprising a measurement of the relative importance of the obtained source on a network;

an SKU estimate comprising an estimate of the number of items offered for sale by the obtained source;

a source utilization estimate comprising an estimate of the number of users requesting information from the obtained source; and a query rank comprising a frequency at which the obtained source appears in the search results.

25. The computer-implemented method of claim 24, wherein the source rank comprises a source rank obtained from a network-based information resource comprising a search engine.

* * * * *